US011449495B2

(12) United States Patent
Utla et al.

(10) Patent No.: US 11,449,495 B2
(45) Date of Patent: Sep. 20, 2022

(54) INDEXABLE DATABASE PROFILES COMPRISING MULTI-LANGUAGE ENCODING DATA AND METHODS FOR GENERATING THE SAME

(71) Applicant: United Parcel Service of America, Inc., Atlanta, GA (US)

(72) Inventors: Murali Krishna Utla, Singapore (SG); Cindy Chong, Singapore (SG); Randy Lee, Singapore (SG); Mohd Saiful Saniff, Singapore (SG); Kent Koh, Singapore (SG); Kyaw Thu Win, Singapore (SG); Jeffrey Cooper, Marietta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 1311 days.

(21) Appl. No.: 15/664,882

(22) Filed: Jul. 31, 2017

(65) Prior Publication Data

US 2018/0218033 A1 Aug. 2, 2018

Related U.S. Application Data

(60) Provisional application No. 62/453,348, filed on Feb. 1, 2017.

(51) Int. Cl.
*G06F 16/00* (2019.01)
*G06F 16/242* (2019.01)
(Continued)

(52) U.S. Cl.
CPC ........ *G06F 16/243* (2019.01); *G06F 16/2228* (2019.01); *G06F 16/2365* (2019.01);
(Continued)

(58) Field of Classification Search
CPC .............. G06F 16/243; G06F 16/2228; G06F 16/2365; G06F 16/5866
(Continued)

(56) References Cited

U.S. PATENT DOCUMENTS

| 5,546,575 | A | * | 8/1996 | Potter | ................... G06F 16/284 |
| | | | | | 708/203 |
| 5,603,025 | A | | 2/1997 | Tabb et al. | |

(Continued)

FOREIGN PATENT DOCUMENTS

| JP | 2008-083878 A | 4/2008 |
| JP | 2014-174921 A | 9/2014 |
| WO | 95/05630 A2 | 2/1995 |

OTHER PUBLICATIONS

International Search Report and Written Opinion received for PCT Patent Application No. PCT/US2017/065844, dated Mar. 14, 2018, 12 pages.

*Primary Examiner* — Ashish Thomas
*Assistant Examiner* — Rezwanul Mahmood
(74) *Attorney, Agent, or Firm* — Shook, Hardy & Bacon L.L.P.

(57) ABSTRACT

Data encoded in multiple languages, such as single byte languages and multi-byte languages, may be generated and stored in a single indexable information/data profile in a database. The information/data profile may comprise indexable information/data fields configured for storing information/data in a standardized language encoding and non-indexable information/data fields configured for storing information/data in a language different from the standardized language. The standardized language may be generated by translating the information/data stored in the non-indexable information/data fields to enable indexing of the entire information/data profile. The information/data profile may be utilized to generate various information/data outputs, (Continued)

such as shipping labels including at least one of the standardized language or the other language while enabling the information/data profile to be indexed based at least in part on the standardized language.

19 Claims, 4 Drawing Sheets

(51) Int. Cl.
| | |
|---|---|
| *G06F 16/23* | (2019.01) |
| *G06F 16/58* | (2019.01) |
| *G06Q 30/02* | (2012.01) |
| *G06F 16/22* | (2019.01) |
| *G06Q 10/08* | (2012.01) |
| *G06Q 50/28* | (2012.01) |
| *G06Q 10/10* | (2012.01) |
| *G06F 40/126* | (2020.01) |
| *G06F 40/129* | (2020.01) |
| *G06F 40/174* | (2020.01) |

(52) U.S. Cl.
CPC ........ *G06F 16/5866* (2019.01); *G06F 40/126* (2020.01); *G06F 40/129* (2020.01); *G06Q 10/083* (2013.01); *G06Q 10/10* (2013.01); *G06Q 30/02* (2013.01); *G06Q 50/28* (2013.01); *G06F 40/174* (2020.01)

(58) Field of Classification Search
USPC .......................................................... 707/756
See application file for complete search history.

(56) References Cited

U.S. PATENT DOCUMENTS

| | | | | |
|---|---|---|---|---|
| 5,835,912 | A | 11/1998 | Pet | |
| 5,890,103 | A * | 3/1999 | Carus .................... | G06F 16/313 707/E17.084 |
| 6,490,579 | B1 * | 12/2002 | Gao ....................... | G06F 16/951 707/999.005 |
| 6,757,688 | B1 * | 6/2004 | Leapaldt ................ | G06F 40/126 715/255 |
| 7,013,289 | B2 * | 3/2006 | Horn ..................... | G06Q 10/087 705/26.61 |
| 7,406,472 | B2 | 7/2008 | Manucha et al. | |
| 7,426,514 | B2 | 9/2008 | Dutta et al. | |
| 7,596,500 | B1 | 9/2009 | Thompson et al. | |
| 7,657,539 | B2 | 2/2010 | Dutta et al. | |
| 8,135,575 | B1 * | 3/2012 | Dean ..................... | G06F 16/243 704/7 |
| 8,346,777 | B1 * | 1/2013 | Auerbach ............. | G06F 16/951 707/741 |
| 8,594,994 | B1 * | 11/2013 | Dean ...................... | G06F 40/58 704/7 |
| 8,972,570 | B1 * | 3/2015 | Moreels ............... | H05K 999/99 709/224 |
| 9,177,281 | B2 * | 11/2015 | Parameswaran ....... | G06Q 10/08 |
| 9,305,226 | B1 * | 4/2016 | Yuan .................... | G06V 30/268 |
| 9,342,503 | B1 * | 5/2016 | Evans ................. | G06F 16/3337 |
| 10,324,988 | B2 * | 6/2019 | Bhat .................... | G06F 16/9535 |
| 10,498,851 | B2 * | 12/2019 | Anglin .................. | H04L 67/565 |
| 2001/0051876 | A1 | 12/2001 | Seigel et al. | |
| 2002/0152093 | A1 * | 10/2002 | Chalmers ............... | G06Q 30/02 705/28 |
| 2003/0187681 | A1 * | 10/2003 | Spain ...................... | G06F 40/55 705/28 |
| 2004/0149826 | A1 * | 8/2004 | Alleshouse ............. | G06F 17/00 235/432 |
| 2005/0190400 | A1 * | 9/2005 | Redd .................. | H04N 1/00204 705/26.1 |
| 2005/0210023 | A1 * | 9/2005 | Barrera ............. | G06F 16/24537 707/999.005 |
| 2005/0223027 | A1 * | 10/2005 | Lawrence ............... | G06F 16/90 |
| 2005/0234929 | A1 * | 10/2005 | Ionescu .................. | G06F 16/972 |
| 2005/0246684 | A1 * | 11/2005 | Shiraishi ............... | G06F 3/1284 717/115 |
| 2006/0179045 | A1 * | 8/2006 | Grinsfelder ............ | G06Q 30/02 |
| 2006/0206304 | A1 * | 9/2006 | Liu ........................ | G06F 40/47 704/2 |
| 2007/0176802 | A1 * | 8/2007 | Fay ....................... | G06F 40/126 341/50 |
| 2008/0059146 | A1 * | 3/2008 | Liu ........................ | G06F 40/45 704/2 |
| 2008/0120317 | A1 | 5/2008 | Gile et al. | |
| 2009/0024595 | A1 * | 1/2009 | Chen ...................... | G06F 40/58 |
| 2010/0318571 | A1 * | 12/2010 | Pearlman .............. | H04L 12/185 709/204 |
| 2011/0040745 | A1 * | 2/2011 | Zaydman ............ | G06F 16/2453 707/E17.014 |
| 2011/0125735 | A1 * | 5/2011 | Petrou ................... | G06F 16/532 707/723 |
| 2011/0137636 | A1 * | 6/2011 | Srihari ..................... | G06F 40/53 704/2 |
| 2011/0282645 | A1 * | 11/2011 | Khuda .................... | G06F 40/58 704/277 |
| 2012/0054192 | A1 * | 3/2012 | Song ................... | G06F 16/9566 707/741 |
| 2013/0238629 | A1 * | 9/2013 | Kosuri ................ | H04L 41/0859 707/741 |
| 2014/0164354 | A1 * | 6/2014 | Victor ..................... | G06F 16/13 707/715 |
| 2014/0172407 | A1 * | 6/2014 | Eden ...................... | G06F 40/42 704/2 |
| 2014/0279440 | A1 | 9/2014 | Felix | |
| 2014/0280195 | A1 * | 9/2014 | Etzioni .................... | G09B 5/12 707/741 |
| 2015/0006422 | A1 * | 1/2015 | Carter ................. | G06Q 10/1053 705/321 |
| 2015/0039700 | A1 * | 2/2015 | West ..................... | G06Q 10/107 709/206 |
| 2015/0079553 | A1 * | 3/2015 | Arnold ............... | G06Q 30/0241 434/157 |
| 2015/0095370 | A1 * | 4/2015 | Davidson ............... | H04L 67/30 707/769 |
| 2015/0242194 | A1 * | 8/2015 | Vargas .................... | G06F 8/51 717/137 |
| 2016/0020782 | A1 * | 1/2016 | Ruff ........................ | H03M 7/30 341/95 |
| 2016/0103861 | A1 * | 4/2016 | Jacob .................... | G06F 16/958 707/711 |
| 2016/0103913 | A1 * | 4/2016 | Jacob .................. | G06F 16/9566 707/709 |
| 2016/0110467 | A1 * | 4/2016 | Hern ..................... | G06K 7/1447 235/375 |
| 2016/0224600 | A1 * | 8/2016 | Munk .................... | G06Q 20/08 |
| 2016/0259785 | A1 * | 9/2016 | Brown .................. | G06F 16/11 |
| 2016/0275455 | A1 * | 9/2016 | Moll ...................... | G06Q 50/01 |
| 2016/0306871 | A1 * | 10/2016 | Chauhan ............. | G06F 16/2477 |
| 2017/0048340 | A1 * | 2/2017 | Zhang .................... | G06F 16/335 |
| 2017/0161264 | A1 * | 6/2017 | Zhao ...................... | G06Q 50/01 |
| 2018/0060207 | A1 * | 3/2018 | Elgebeely ............... | G06F 11/36 |
| 2018/0095949 | A1 * | 4/2018 | Lewis ................. | G06F 16/9537 |
| 2018/0129691 | A1 * | 5/2018 | Mathur ............... | G06F 16/2272 |
| 2018/0150563 | A1 * | 5/2018 | Brunn .................. | G06F 16/951 |
| 2018/0198880 | A1 * | 7/2018 | Anglin .................. | G06F 15/173 |
| 2018/0218033 | A1 * | 8/2018 | Utla ..................... | G06F 16/243 |
| 2018/0341657 | A1 * | 11/2018 | Labbi ................. | G06F 16/24564 |
| 2019/0146763 | A1 * | 5/2019 | Gould ................. | G06F 16/285 717/144 |
| 2019/0281064 | A1 * | 9/2019 | Patrich .................. | G06F 16/955 |
| 2019/0349350 | A1 * | 11/2019 | Valites .................... | H04L 63/20 |
| 2020/0034345 | A1 * | 1/2020 | Ikai ........................ | G06F 16/81 |
| 2021/0225468 | A1 * | 7/2021 | Saliman ................. | G16H 50/30 |
| 2022/0121721 | A1 * | 4/2022 | Venkatashivareddy ..................... G06F 16/9538 | |

* cited by examiner

INDEXABLE DATABASE PROFILES COMPRISING MULTI-LANGUAGE ENCODING DATA AND METHODS FOR GENERATING THE SAME

CROSS-REFERENCE TO RELATED APPLICATIONS

This patent application claims priority from U.S. provisional patent application Ser. No. 62/453,348, filed Feb. 1, 2017, which is incorporated herein by reference in its entirety.

BACKGROUND

Various programmatic systems are configured for operation with a specific language. Notably, various programmatic systems configured for management of domestic and/or international shipments are configured to operate using the English language, even for shipments originating in, or bound for countries having a different national language. Although various English-language based programmatic systems may be adapted to accept non-English language entries utilizing Latin characters, such programmatic systems are often unequipped to accept non-Latin characters for origination and/or destination data. Due at least in part to the configuration of such programmatic systems, local shipment handling personnel operating in countries in which English is not a standardized language are required to maneuver packages in accordance with English-language shipping information/data, despite challenges that may be encountered when utilizing English-based information/data in non-English speaking countries.

Because existing programmatic systems are incapable of accepting and/or utilizing non-Latin characters users of such programmatic systems are required to manually provide Latin-character equivalents of information originally provided using non-Latin character languages to the existing programmatic systems. Such requirements significantly slow processing of such shipments, and introduce the possibility of human error in information processing. Accordingly, a need exists for systems and methods for automatically adapting non-Latin characters (e.g., stored as multi-byte characters in computing systems) for use with existing management entities capable of processing only Latin-characters (e.g., stored as single-byte characters in computing systems).

BRIEF SUMMARY

Various embodiments are directed to systems and methods providing an electronic data interface enabling entry, storage, and output of non-standardized languages, such as languages utilizing multi-byte characters, such as shipping information/data presented in a non-standardized language while enabling a management computing entity to index, search, and/or process associated shipping information/data in a standardized language (e.g., a single-byte language).

Because international shipping carriers often carry shipments into and/or between countries having standardized languages different from the shipping carriers' origin, shipping information/data for these shipments must often be translated or otherwise made to comply with standardized processing aspects of the shipping carriers existing shipment management computing entities. However, because local carrier employees in these countries may be incapable of deciphering information/data presented in a standard language of the carrier, and the management computing entities may be incapable of deciphering information/data presented in the local language of a particular country, various embodiments provide an information/data encoding translation module and computing system that enables shipping information/data to be input and/or output in various languages that may be otherwise unprocessable by existing management computing entity architectures, while providing standardized language shipping information/data to the management computing entity to enable processing and indexing of the shipping information/data.

Various embodiments are directed to computer-processing method for incorporating multiple language encodings into an indexed dataset processable by executable computing modules operable with a standardized language encoding. In various embodiments, the method comprises receiving original input information/data encoded in a first language; generating an information/data profile having an associated information/data profile identifier, wherein the information/data profile comprises one or more indexable information/data fields and one or more non-indexable information/data fields; storing the original input information/data in one or more non-indexable information/data fields; translating the original input information/data into translated input information/data encoded in the standardized language; storing the translated input information/data in one or more indexable information/data fields of the information/data profile; and providing the information/data profile comprising the original input information/data and the translated input information/data to a database storing a plurality of information/data profiles as an indexed dataset based at least in part on translated input information/data encoded in the standardized language in each of the plurality of information/data profiles.

Moreover, certain embodiments are directed to a computing system for incorporating multiple language encodings into an indexable dataset processable by executable computing modules operable with a standardized language encoding. In certain embodiments, the computing system comprises: at least one nontransitory computer readable storage medium; one or more computer processors collectively configured to: receive original input information/data encoded in a first language; generate an information/data profile having an associated information/data profile identifier, wherein the information/data profile comprises one or more indexable information/data fields and one or more non-indexable information/data fields; store the original input information/data in one or more non-indexable information/data fields; translate the original input information/data into translated input information/data encoded in the standardized language; store the translated input information/data in one or more indexable information/data fields of the information/data profile; and provide the information/data profile comprising the original input information/data and the translated input information/data to a database storing a plurality of information/data profiles as an indexed dataset based at least in part on translated input information/data encoded in the standardized language in each of the plurality of information/data profiles.

Moreover, various embodiments are directed to a computer program product comprising at least one non-transitory computer-readable storage medium having computer-readable program code portions stored therein. In certain embodiments, the computer-readable program code portions comprise: an executable portion configured to receive original input information/data encoded in a first language; an executable portion configured to generate an information/ data profile having an associated information/data profile identifier, wherein the information/data profile comprises one or more indexable information/data fields and one or more non-indexable information/data fields; an executable portion configured to store the original input information/data in one or more non-indexable information/data fields; an executable portion configured to translate the original input information/data into translated input information/data encoded in the standardized language; an executable portion configured to store the translated input information/data in one or more indexable information/data fields of the information/data profile; and an executable portion configured to provide the information/data profile comprising the original input information/data and the translated input information/data to a database storing a plurality of information/data profiles as an indexed dataset based at least in part on translated input information/data encoded in the standardized language in each of the plurality of information/data profiles.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
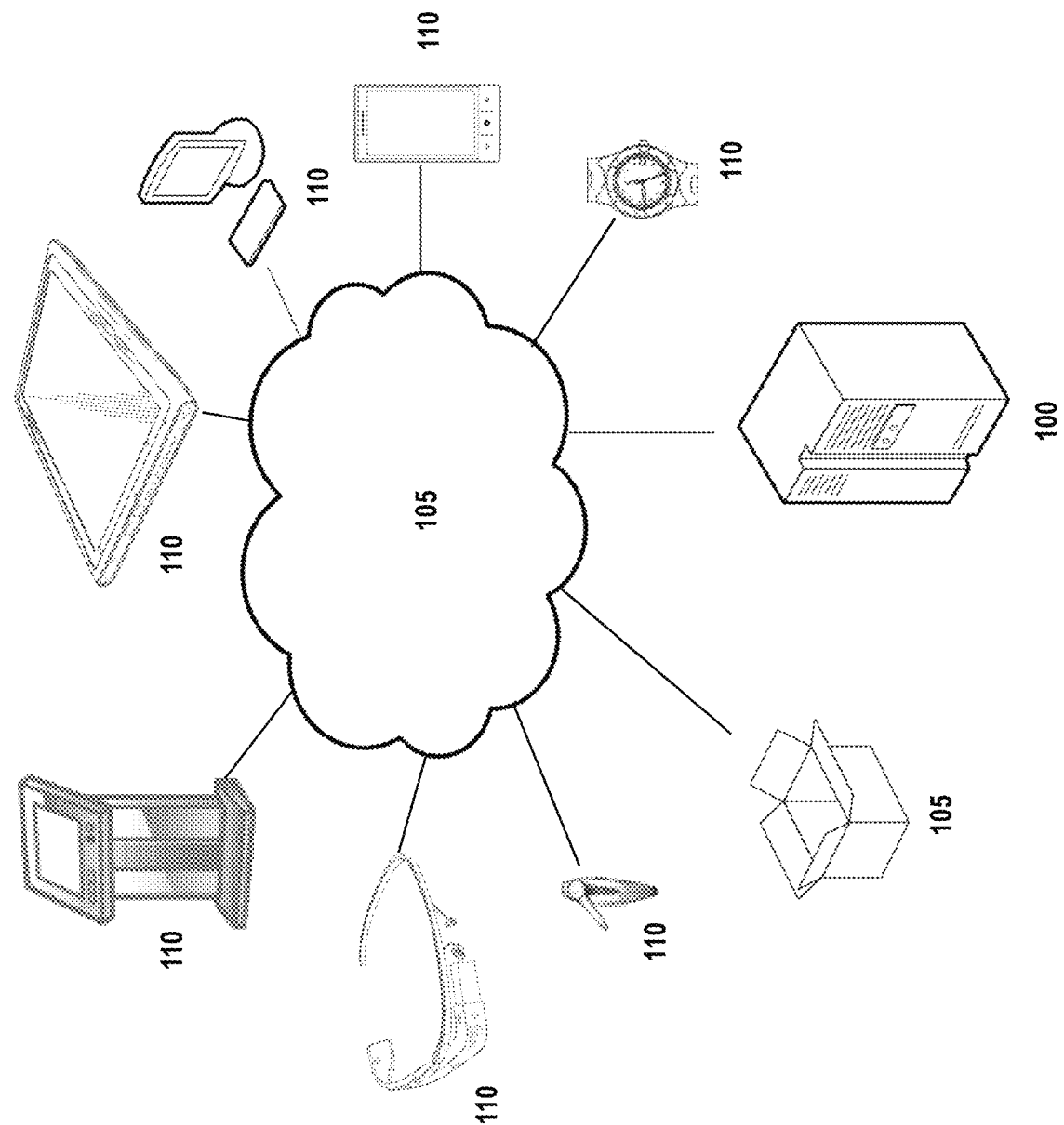
FIG. 1 shows a system that may be utilized in accordance with various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments provide an electronic data interface configured to accept shipping information/data for various shipments in any of a variety of non-Latin character based languages, translating the shipping information/data to extract information/data to be provided to a management computing entity, and generating and printing shipping labels in a local language for a destination location while maintaining appropriate English-based label contents to enable processing by the shipment management system.

More broadly, the electronic data interface may be configured to enable utilization and storage of shipping information/data by a shipment management entity operating primarily in a standardized language in instances in which the shipping information/data is provided in a secondary language different from the standardized language. Thus, the electronic data interface is configured to overcome computational difficulties associated with processing characters not provided in a standardized language of a programmatic system.

The electronic data interface may be configured to logically filter and process shipping information/data received for various shipments prior to the shipping information/data being presented to a management computing entity. The electronic data interface is configured to determine whether the received shipping information/data is presented in a standardized language usable by the management computing entity, or if the shipping information/data is in a secondary language not usable by the management computing entity.

Upon determining that the shipping information/data is received in the standardized language, the electronic data interface transmits the shipping information/data to the management computing entity for processing and storage. However, upon a determination that the shipping information/data is not presented in the standardized language, the electronic data interface is configured to translate at least a portion of the shipping information/data into the standardized language, and to transmit at least a portion of the translated shipping information/data to the management computing entity.

In various embodiments, while the electronic data interface is translating the shipping information/data, the electronic data interface may be configured to scan the shipping information/data to identify the language in which the shipping information/data is presented and to translate the shipping information/data into the standardized language. In certain embodiments the electronic data interface may be configured to perform the language identification and translation processes locally. However, in certain embodiments, the electronic data interface may be configured to transmit the shipping information/data to an external translation computing entity configured to identify the language of the shipping information/data and/or to translate the shipping information/data into the standardized language.

Moreover, in certain embodiments, the electronic data interface may be configured to enable the shipment management entity to store original, secondary-language shipping information/data in association with a shipment record generated and stored by the management computing entity. Although the management computing entity may be unable to utilize information/data stored in the secondary-language based shipping information/data, the management computing entity may be configured to provide at least a portion of the secondary-language shipping information/data within generated label information/data to be printed and secured onto the shipment. In various embodiments, the electronic data interface may be configured to enable the management computing entity to store an image of the original shipping information/data provided at the shipment origin. The image may later be provided to various users (e.g., by transmitting the image information/data to user devices) to enable a visual comparison between the originally provided shipping information/data and the electronic shipping information/data provided in a secondary language at a shipment destination.

In various embodiments, the electronic data interface may be configured to translate information/data from the standardized language of the management computing entity to a secondary language associated with a delivery location for a shipment. As a specific example, the electronic data interface may be configured to translate shipping information/data from the language in which it is stored in the management computing entity into the local language of the area in which the shipment is destined. Thus, local shipment handling employees (e.g., delivery personnel) at the destination location need not translate the shipping information/data into their preferred language prior to delivery.

Accordingly, various embodiments may facilitate shipments between various locations in which shipping information/data is generally provided in one or more languages not usable by a management computing entity. For example, various embodiments may facilitate shipments between Singapore and Japan using the local languages of the respective origin and destination countries on shipment labels, while a centralized management computing entity may be configured to monitor the status of the shipment using an English-based programmatic system. The same centralized management computing entity may be further configured to monitor shipments between Hong Kong and Japan; between Hong Kong and Korea; and/or between various other locations utilizing non-Latin character based languages.

In certain embodiments, the management computing entity may be configured to generate a single label comprising information/data in various languages in order to facilitate processing by the management computing entity, various user computing entities, and to facilitate handling by employees in the origin location, the destination location, and/or the like. For example, the combination label may comprise shipment origin information/data identifying the origin location in a language associated with the origin location, shipment destination information/data identifying the destination location in a language associated with the destination location, and/or the like. The combination label may further comprise shipping information/data, such as shipment destination data, shipment origin data, and/or the like, in a standardized language usable by the management computing entity. For example, a country code and/or country indication may be provided in a standardized language, and the remaining shipping information/data may be provided in a secondary language (e.g., a language corresponding to the origin location, a language corresponding to the destination location, and/or the like).

Moreover, in certain embodiments, the management computing entity may be configured to store shipping information/data for a corresponding shipment, and to provide shipping information/data to one or more user computing entities upon receipt of a request from the one or more user computing entities (e.g., generated by the user computing entity upon scanning an indicia, such as a bar code, QR code, Maxicode, RFID tag, and/or the like, on a shipment). In various embodiments, the request for shipping information/data may additionally comprise language preference information/data received from the user computing entity. The language preference information/data may identify a preferred language for which the shipping information/data is to be provided to the user computing entity. In various embodiments, the preference information/data may be provided to the electronic data interface, which may be configured to translate the shipping information/data to the preferred language before the shipping information/data is transmitted to the requesting user device. In certain embodiments, the preferred language may be identified based on user input received by the user device, and/or the preferred language may be identified based on the current location of the user device. For example, the current location of the user device may be compared against a matrix that is indicative of prevalent languages at particular locations. The preferred language, and accordingly the language in which the shipping information/data is provided to the user device, may be identified as the prevalent language for the current location of the user device. In such embodiments, the user device may receive the shipping information/data in the preferred language, and may be configured to generate a display providing at least a portion of the shipping information/data in the preferred language.

As a specific example, a package handling employee may scan an indicia on a package in Russia, thereby causing the user computing entity to request shipping information/data for the shipment. The management computing entity and the electronic data interface may thereby retrieve the shipping information/data, and may provide the shipping information/data to the user device in Russian, upon determining that Russian is the prevalent language in Russia, the current location of the user computing entity. Thus, regardless of the language in which shipping information/data is provided on a label printed on a shipment, the management computing entity, the electronic data interface, and the user device may be configured to provide the shipping information/data in any of a variety of languages.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more management computing entities 100, one or more networks 105, and/or one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entities

Figure 2:
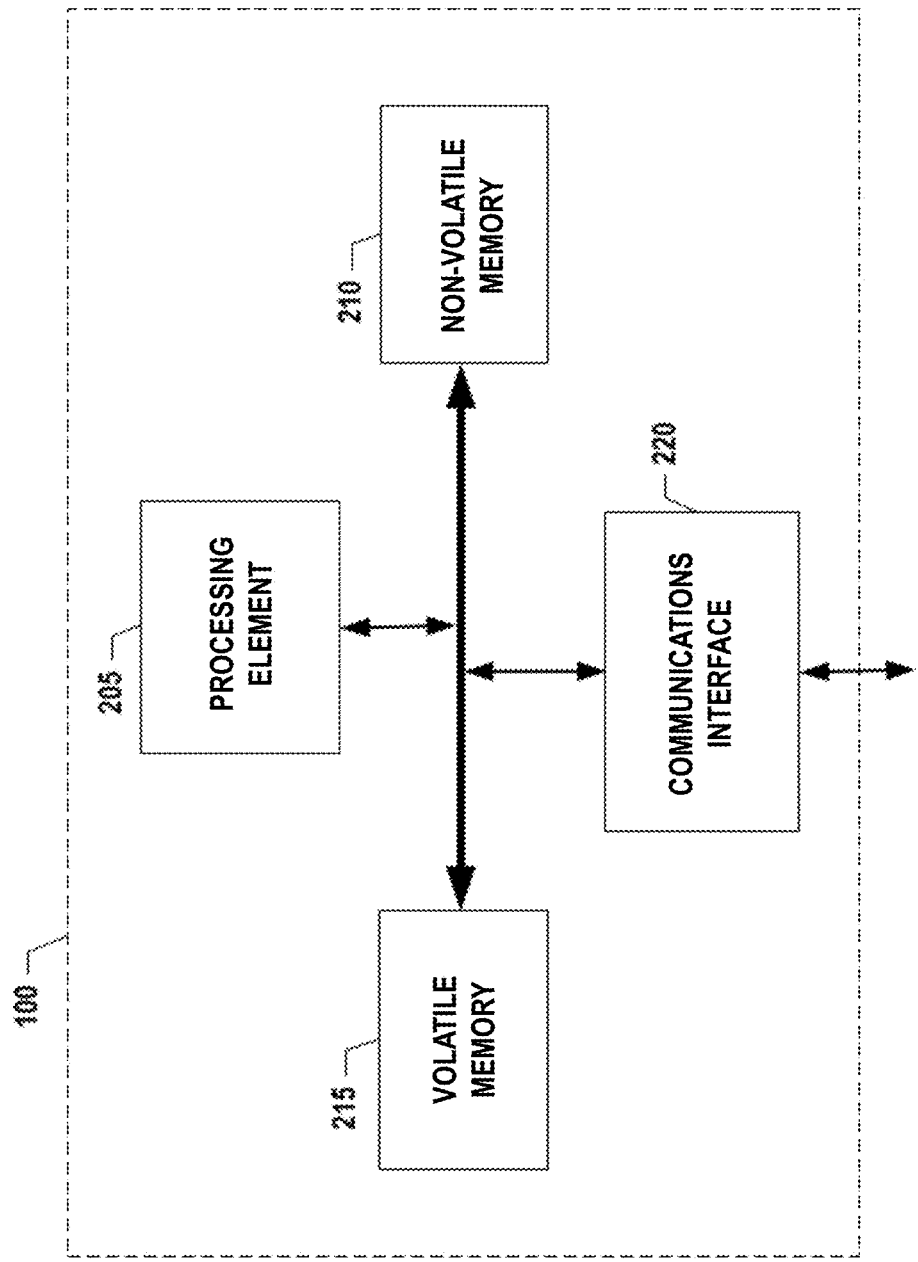
FIG. 2 shows a schematic diagram of a carrier computing entity according to various embodiments.

FIG. 2 provides a schematic of a management computing entity 100 according to one embodiment of the present invention. The management computing entity 100 may be operated by and/or for a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, computer, entity, device, system, and/or similar words used herein interchangeably may refer to, for example, one or more computers, computing entities, desktops, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., item/shipping database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed data interface (FDDI), digital subscriber line (DSL), Ethernet, asynchronous transfer mode (ATM), frame relay, information/data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

In one embodiment, the management computing entity 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
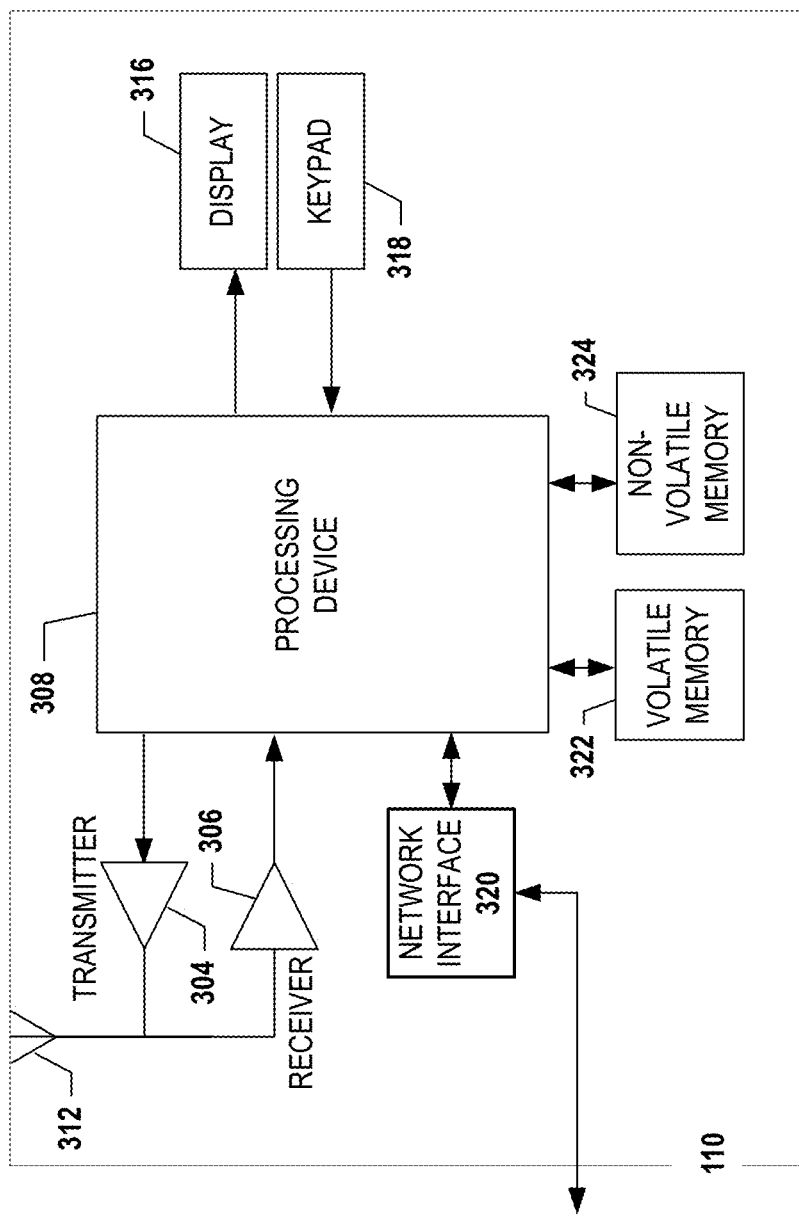
FIG. 3 shows a schematic diagram of a user computing entity according to various embodiments.

A user may be an individual, a family, a company, an organization, an entity, a department within an organization, a representative of an organization and/or person, and/or the like—whether or not associated with a carrier. To do so, a user may operate a user computing entity 110 that may include one or more components that are functionally similar to those of the management computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

3. Language Encoding

Languages are encoded for use with programmatic systems (e.g., computing entities) based at least in part on the characters that form a particular language. Specifically, individual characters are separately encoded to enable a correlation between each character of a particular language and digital computing processing capabilities. Each character is encoded using one or more code points, each of which represent a computer readable representation of a particular language character, such as the Latin characters A, B, and C; various Kana characters, various Arabic characters, various Mandarin characters, various Hangul characters, and/or the like. Character sets may be encoded using any of a variety of encoding formats, however characters utilized in many languages are commonly encoded using a standardized Unicode set of code points (hexadecimal code points ranging between $0_{hex}$ and $10FFFF_{hex}$) which utilizes between 1-4 bytes to represent characters of various languages. Another example character encoding system is ASCII, which is primarily used for single-byte character encoding languages, for example utilizing Latin script characters.

A character encoding methodology is utilized by each computing entity, and may be encoded as a portion of the computing entity operating system, firmware, and/or other software executable by the computing entity. Thus, the computing entities (e.g., a database, a management computing entity 100, a user computing entity 110, and/or the like) may be configured to utilize an embedded character encoding methodology to interpret user input (e.g., to enable storage and indexing of user input in various computing entities), to interpret previously stored information/data provided in various encodings, and/or the like.

Various computing entities, particularly legacy computing entities existing for several years, may have embedded character encoding methodologies configured for use with a single character set, such as single-byte characters. Accordingly, such computing entities may be incapable of interpreting, indexing, or otherwise processing characters not existing in the single character set, such as multi-byte characters.

III. Exemplary System Operation

Various embodiments provide information/data profile configurations enabling the storage and indexing of shipping information/data comprising characters encoded in a language unreadable by the storing database and/or an associated management computing entity 100. Various embodiments enable user computing entities 110 located geographically remotely from a storing database, to upload, request and/or download the stored information/data profiles, including the portions of the information/data unreadable by the storing database for usage and/or display via the management computing entity 100.

1. Example Shipment/Item Information/Data

In certain embodiments, the various processes may be configured for analyzing, translating, and/or otherwise utilizing shipment/item information/data. Accordingly, various embodiments begin by the management computing entity 100 generating and/or receiving shipment/item information/data for one or more shipments/items. For example, a user may initiate a transportation process for a shipment/item by entering identifying information/data into the management computing entity 100. In various embodiments, the user (e.g., a user or user representative operating a user computing entity 110) may access a webpage, application, dashboard, browser, or portal of a carrier. After the user is identified (e.g., based on a corresponding user profile), the user may initiate a transportation process for a shipment/item. In various embodiments, the management computing entity 100 may then provide or be in communication with a user interface (e.g., browser, dashboard, application) for the user to provide shipment/item information/data which includes certain details regarding the shipment/item. In various embodiments, the shipment/item information/data may include a name, street address, city, state, postal code, country, telephone number, and/or the like for both the consignor and the consignee. As discussed herein, the shipment/item information/data may be provided in any of a variety of languages, such as single-byte languages (e.g., Latin-character based languages) and/or multi-byte languages (e.g., non-Latin character based languages). In various embodiments, the user interface may comprise a fillable form with fields including ship-from information/data and ship-to information/data. In various embodiments, some of the information/data fields may be pre-populated. For example, if the user logged into a registered account/profile, the address information/data entered during registration may be pre-populated in certain information/data fields. In some embodiments, the user may also have a digital address book associated with the account comprising address information/data for possible ship-to and/or ship-from information/data. The user may be able to select certain ship-to and/or ship-from information/data from the address book for the associated shipment/item.

In one embodiment, after the management computing entity 100 receives the ship-to and/or ship-from information/data from the user, the management computing entity 100 may perform one or more validation operations. For example, the management computing entity 100 may determine whether a ship-to and/or ship-from address (and/or other addresses) in the specified country or postal code is eligible for a pick-up or delivery. The management computing entity 100 may also determine whether the ship-to and/or ship-from address (and/or other addresses) is valid, e.g., by passing the ship-to and/or ship-from address through one or more address cleansing or standardization systems. The management computing entity 100 may perform a variety of fraud prevention measures as well, such as determining whether the users (or one of the delivery addresses) have been "blacklisted" from user pick-up and/or delivery. As will be recognized, a variety of other approaches and techniques can be used to adapt to various needs and circumstances.

In addition to ship-to and/or ship-from information/data, the parcel information/data may also include service level information/data. The service level options may be, for example, Same Day delivery, Next Day delivery, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the management computing entity 100 (a) may be provided shipment/item characteristics and attributes in the shipment/item information/data and/or (b) may determine shipment/item characteristics and attributes from the shipment/item information/data. The characteristics and attributes may include the dimensions, weight, transportation classifications, planned movements in the carrier's transportation and logistics network, planned times, and/or the like for various shipments/items. For example, the length, width, height, base, radius, and weight can be received as input information/data and/or can be determined or collected by various systems.

2. Example Information/Data Profile

In various embodiments, an information/data profile may comprise a plurality of information/data fields each configured for storing particular types of data. For example, the information/data fields may be organized to store shipping information/data for a particular shipment/item, such as the destination address for the shipment/item, the origin address for the shipment/item, a shipment identifier for the shipment/item, and/or the like. The information/data fields may thus be organized as a street number information/data field, a street name information/data field, a street type information/data field, a city information/data field, a state/province information/data field, a country information/data field, a zip/postal code information/data field, and/or the like. In certain embodiments, the information/data profile may comprise one or more information/data fields corresponding to each type of information/data stored in the information/data profile. For example, the information/data profile may comprise a first plurality of information/data fields associated with a ship to address, a second plurality of information/data fields associated with a ship from address, a third plurality of information/data fields associated with other shipping information/data (e.g., a shipment and/or information/data profile identifier, a shipment weight, a shipment size, and/or the like), and/or the like.

As discussed herein, each information/data profile may comprise an indexable plurality of information/data fields and a non-indexable plurality of information/data fields. The information/data stored in the indexable plurality of information/data fields may be substantively identical to at least a portion of the information/data stored in one or more of the non-indexable information/data fields. For example, the indexable plurality of information/data fields and the non-indexable plurality of information/data fields may both store information/data indicative of a destination address for a shipment, an origin address for the shipment, and/or the like. However, the indexable information/data fields may store the included information/data in a first, standard language encoding (e.g., a single-byte language encoding), and the non-indexable information/data fields may store the included information/data in a second (non-standard) language encoding (e.g., a multi-byte language encoding), such that the information/data profiles are configured for storing information/data in a plurality of language encodings.

As indicated, the indexable plurality of information/data fields each comprise information/data encoded in a standardized language that may be interpreted, read, indexed, and/or the like by the management computing entity 100. For example, the indexable plurality of information/data fields may comprise information/data encoded in a single-byte language encoding (e.g., that may be interpreted using a plurality of encoding mechanisms, such as Unicode and ASCII). The management computing entity 100 (e.g., database) may be configured to index the information/data profile based at least in part on a portion of the indexable information/data fields of the information/data profile. For example, the management computing entity 100 may be configured to index the information/data profile relative to other information/data profiles based on an indexable information/data field indicative of a shipment/data profile identifier (e.g., a string of characters unique to a particular information/data profile).

In certain embodiments, such as those in which the information/data profiles are stored in a database (e.g., managed by the management computing entity 100) incapable of deciphering certain language characters (e.g., because the database and/or management computing entity 100 does not encompass an appropriate encoding mechanism for deciphering the characters of various languages), the non-indexable information/data fields may be configured for storing one or more image information/data files comprising a screen shot or other image of the text to be encoded into the non-indexable information/data fields. As discussed in greater detail herein, each character of the text to be stored in the non-indexable information/data fields may be stored in a corresponding and unique image file (e.g., .jpg, .gif, .tiff, .png, .bmp, and/or the like) or one or more character strings may be stored in a single corresponding image file (e.g., all characters collectively forming the street name for a destination address). In embodiments in which each information/data field comprises a plurality of image files, the image files may have file names indicative of an order corresponding to the characters reflected in the string of image files (e.g., the file names may be provided in the standardized language encoding). As a non-limiting example, a first image file reflecting a first character in a character string may have a file name "1," a second image file reflecting a second character in the character string may have a file name "2," and/or the like. In such embodiments, a user computing entity 110 may be configured to use an executable optical character recognition (OCR) computing program (e.g., stored in a memory storage device of the user computing entity 110) to interpret the included image files to identify the characters displayed in each image file. In certain embodiments, the OCR computing program may be configured to scan portions of the images (e.g., various combinations of pixels embedded within a particular image file) to identify textual characters visible therein. For example, the OCR computing program may be configured to review the image file to search for combinations of pixels collectively forming a textual character, for example, by comparing various pixel combinations against a known database of textual characters.

As yet another example, in certain embodiments, the non-indexable information/data fields may be configured to store a binary or hexadecimal representation of each character provided in the non-indexable information/data fields. For example, an information/data field representing a street name presented in a language indecipherable by the management computing entity 100 may comprise a series of hexadecimal strings, each hexadecimal string representing a Unicode representation of a particular character, and collectively the series of hexadecimal strings represents the street name. In certain embodiments, one or more of the non-indexable information/data fields may additionally comprise one or more lines of executable programming code that, when received by a user computing entity 110, may be executed to compile the hexadecimal character strings into the represented characters of the language.

Accordingly, the information/data profiles are configured to store a plurality of information/data types encoded via a plurality of language encodings, such that the information/data profiles may store information/data in a plurality of languages, such as in single-byte languages and multi-byte languages, simultaneously. For example, the information/data profiles enable a legacy computing system capable of deciphering only single-byte language encodings (e.g., Latin characters encoded using ASCII language encoding) to maintain information/data regarding shipments be transferred between two or more locations utilizing one or more multi-byte languages, while still maintaining provided multi-byte shipping information/data usable by local carrier employees within the locations. Thus, a shipment travelling between South Korea and Japan and transferred by a carrier having one or more U.S.-based legacy computing systems may be associated with an information/data profile comprising shipping information/data (e.g., destination address information/data) in both Japanese and English, such that both Japanese-speaking individuals and English-speaking individuals have access to shipping information/data relating to the shipment.

3. Generating a Shipping Profile

Figure 4:
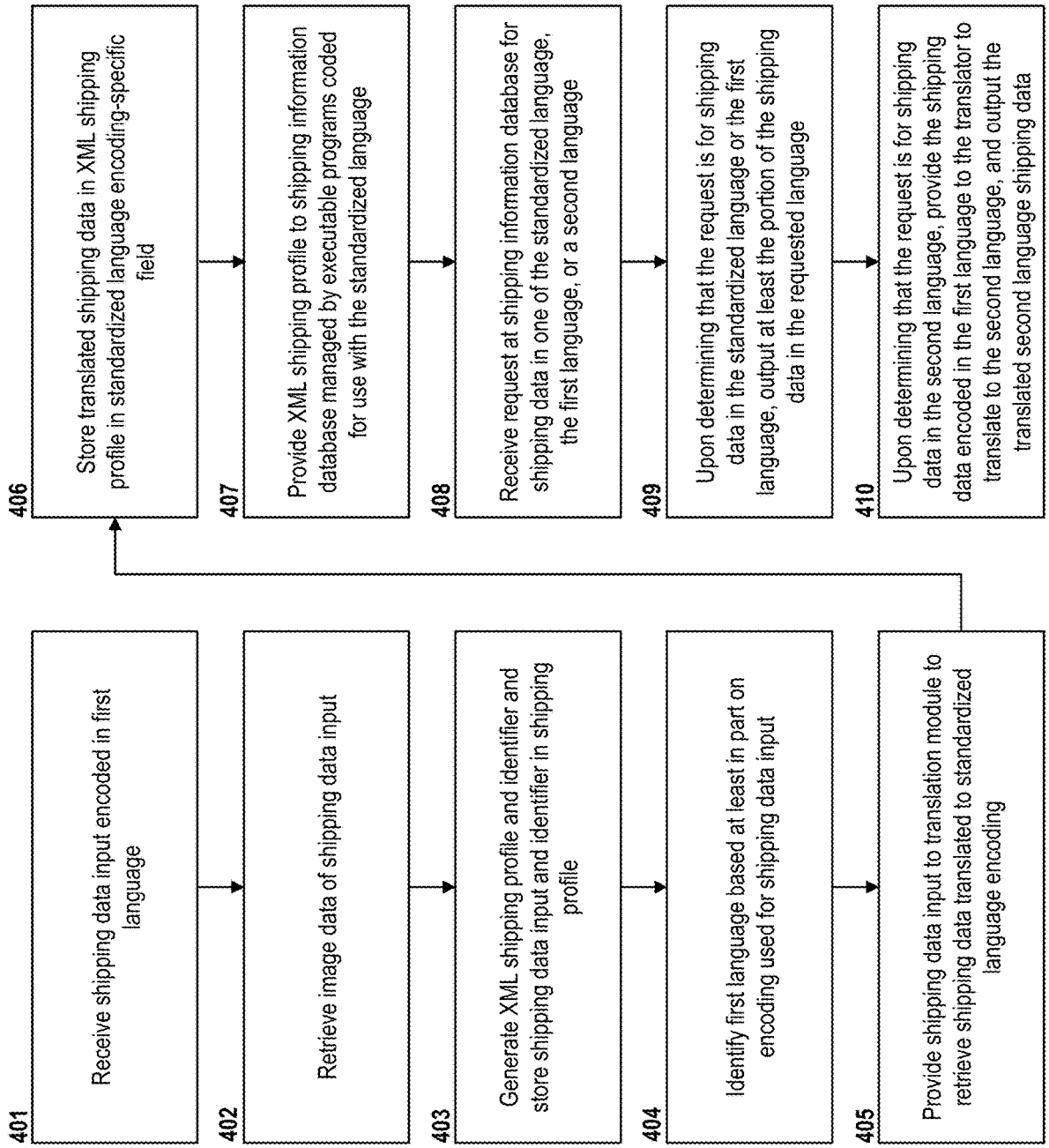
FIG. 4 is a flowchart showing an example process for generating a composite shipment information/data profile comprising information/data encoded in at least two different encodings.

FIG. 4 illustrates various steps for generating and utilizing an information/data profile comprising shipping information/data according to various embodiments. Although the various steps are described and illustrated as being reflective of the generation, storage, and usage of shipping information/data within a shipping profile, it should be understood that the various concepts discussed herein may be utilized with any information/data substance to be stored in an information/data profile comprising information/data encoded in at least two languages and/or utilizing at least two language character sets (e.g., Mandarin characters and Latin characters).

Moreover, various embodiments may be usable with information/data to be stored in a single language encoding only. Thus, various embodiments may be configured to identify an input information/data language and, upon determining that the input information/data language is the standardized information/data language, a management computing entity 100 may generate an information/data profile comprising only information/data in the standardized encoding language. The information/data profiles comprising information/data only in the standardized encoding language may be stored and/or indexed together with other information/data profiles comprising information/data in a plurality of language encodings.

With reference to FIG. 4, one or more computing entities (e.g., management computing entity 100) may receive shipping information/data input encoded in a first language, such as a non-standardized language, as indicated at Block 401. Such shipping information/data may be received, for example, as a user provides user input indicative of information/data relating to a current, prospective, or planned shipment. As a specific example, as a user provides user input to initiate a transportation process for a shipment/item, the management computing entity 100 may receive the shipping information/data encoded in the first language.

The receiving computing entity may be a user computing entity 110 receiving user input indicative of the shipping information, a management computing entity 100 receiving shipping information/data transmitted from a user computing entity 110, and/or the like. Specifically, certain embodiments may receive shipping information/data input via an Application Programming Interface (API) input configured to format or otherwise provide the received information/data to a pre-processing module of the computing entity (e.g., management computing entity 100) prior to storing a generated information/data profile in a database. The pre-processing module is configured to format the received information/data into the appropriate information/data format (e.g., language encoding, series of information/data fields, and/or the like) for storage in the database to minimize information/data loss and/or file corruption that may be caused by attempting to store incompatible information/data types in a database (e.g., attempting to store incompatible language encoding characters in the database).

In certain embodiments, the received shipping information/data may comprise a ship to address (e.g., recipient's name, destination street address, destination city, destination state/province, destination country, destination zip/postal code, and/or the like); a ship from address (e.g., a shipper's name, an origin street address, an origin city, an origin state/province, an origin country, an origin zip/postal code, and/or the like); shipping information/data, such as a shipment size, a shipment weight, a planned time, a shipment quantity, a shipment service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), and/or the like. Moreover, the shipping information may be provided in a non-standard language, such as a multi-byte language (in embodiments in which the standard language is a single-byte language). As a specific example, for a shipment travelling between Korea and Japan to fulfill an order placed by a resident of Japan, the shipping information/data may be provided using Japanese characters (e.g., based on shipping information provided by the Japanese resident when placing the order).

As noted at Block 402 of FIG. 4, various embodiments retrieve image information/data of the shipping information/data input. As discussed herein, image information/data reflecting one or more characters of the shipping information/data provided in the first, non-standardized language may be retrieved such that the image information/data may be stored in the information/data profile, as discussed herein. For example, a management computing entity 100 receiving the shipping information/data input may capture one or more screen shots providing one or more images of the shipping information/data, as input in the first language. As noted herein, the computing entity (e.g., management computing entity 100) may capture an image of each character included in the shipping information/data, each string of text included in the shipping information/data, and/or the entirety of the shipping information/data as a whole. For example, upon receipt of user input providing shipment/item information/data in a multi-byte language (e.g., for a shipment/item to be transported between Singapore and Japan), the management computing entity 100 may be configured to convert the received shipment/item information data into image data to preserve the look of the various characters within the received user input.

As a specific example, various computing entities (e.g., management computing entity 100 and/or user computing entity 110) comprising language encoding mechanisms configured for identifying multi-byte characters may be configured to identify the location of each character within the shipping information/data, including the boundaries of each character within the displayed shipping information/data (e.g., based on a measured number of pixels away from a particular reference point within the displayed data, such as a top left corner of the displayed data). Based on the determined location of each character, the computing entity may be configured to capture image information/data reflecting each character. Similar methodologies may be utilized for locating character strings and/or the entirety of the displayed shipping information/data.

As noted at Block 403, a computing entity (e.g., management computing entity 100) is configured to generate a shipping profile (e.g., an information/data profile) for storing the shipping information/data. As noted in FIG. 4, the shipping profile may comprise an extensible markup language (XML) information/data file, however any of a variety of information/data profile file types may be utilized. The shipping profile may be generated with a plurality of information/data fields organized according to known information/data types to be stored therein. For example, the information/data fields may be generated based at least in part on the types of information/data to be stored in the database and/or to be utilized for indexing of the information/data profile relative to other information/data profiles. With reference to above-mentioned examples, the information/data fields may comprise a plurality of information/data fields indicative of a destination location (e.g., recipient name, destination street address, destination city, destination state/province, destination zip/postal code, destination country, and/or the like); an origin location (e.g., shipper name, origin street address, origin city, origin state/province, origin zip/postal code, origin country, and/or the like); and/or the like. Moreover, as noted in Block 403, the shipping profile may be generated together with a shipment/profile identifier, such as a character string (e.g., presented in the standardized language) that may be stored in an information/data field associated with the shipping profile.

Moreover, the shipping profile may be generated with a first plurality of information/data fields configured for storage of shipping information/data in the standardized language encoding, and a second plurality of information/data fields configured for storage of shipping information/data in at least the first language (e.g., at least one non-standardized language encodings). At least a portion of the information/data fields in the first plurality of information/data fields correspond to information/data fields in the second plurality of information/data fields (e.g., a street address information/data field in the first plurality of information/data fields may correspond to a street address information/data field in the second plurality of information/data fields), and may comprise substantively identical data, stored in a standardized language in the first plurality of information/data fields and at least one non-standardized language in the second plurality of information/data fields. Upon determining that the shipping information/data input is provided in a non-standardized language, the shipping information/data input may be stored in the shipping profile in the second plurality of information/data fields.

Because the shipping profile is configured for storage and/or indexing based on included information/data in the standardized language encoding, the first plurality of information/data fields may be coded or otherwise flagged as being capable of indexing by the database and/or computing entity. The second plurality of information/data fields may be flagged or otherwise indicated as non-indexable information/data fields, and accordingly these information/data fields may be utilized for storing the shipping information/data in the non-standardized language encoding. By storing the non-standardized language encoding version of the shipping information/data in the non-indexable information/data fields, the shipping profiles prevent the non-standardized language encoding from being considered during indexing of the shipping profile.

As indicated at Block 404 of FIG. 4, the computing entity (management computing entity 100) is configured to identify the first language (e.g., the language of the shipping information/data stored in the second plurality of information/data fields of the shipping profile). For example, the computing entity may be configured to identify one or more code points utilized for encoding one or more characters of the first language, and to identify a language grouping encompassing the identified code points. For example, one or more characters in the shipping information/data input may be translated to the Unicode hexadecimal equivalent of the one or more characters, and the hexadecimal equivalent may be compared to one or more groupings (e.g., a series of consecutive hexadecimal values) of language encodings, each grouping being associated with a known language. By determining the grouping encompassing the particular character, the computing entity may be configured to identify the language of the shipping information/data input received by the computing entity. In certain embodiments, particularly those in which the shipping information/data input is stored as the hexadecimal equivalents of the first language in the second information/data fields, the computing entity (e.g., management computing entity 100) may be configured to generate an executable program to be stored with the shipping profile identifying the language to which the hexadecimal information/data should be translated upon extraction of the shipping profile from the database (e.g., by a user computing entity 110). In embodiments in which the shipping information/data input comprise information/data in a plurality of languages, the computing entity may be configured to identify each of the languages reflected in the shipping information/data input.

The management computing entity 100 may be configured to provide the shipping information/data (encoded in the first, non-standardized language) to a translation module, as indicated at Block 405 to generate translated shipping information/data provided in the standardized language encoding. In various embodiments, the translation module may be stored within a memory device associated with the management computing entity 100, and accordingly the translation module may be executable by the management computing entity 100. However, in certain embodiments, the translation module may be executable by a third party computing entity located geographically remotely from the management computing entity 100. For example, the translation module may be operated by Microsoft Bing®, Google Translate®, and/or the like. In various embodiments, the translation module may be configured to convert shipping information/data provided in a multi-byte language encoding into translated shipping information/data provided in a single-byte language encoding. As a non-limiting example, shipping information/data provided in Mandarin, Japanese, or Korean characters may be translated into Latin characters. The translation module may transmit the translated shipping information/data to the management computing entity 100 (e.g., in embodiments in which the translation module is operable on a computing entity separate from the management computing entity 100), and the management computing entity 100 may store the translated shipping information/data in the first plurality of information/data fields (e.g., the indexable information/data fields), as indicated at Block 406 of FIG. 4. Upon providing the translated shipping information/data to the shipping profile, the management computing entity 100 may be configured to store the shipping profile in the database, as indicated at Block 407. As noted in FIG. 4, the database may be managed by the management computing entity 100 with one or more executable programs configured for operating with the standardized language only, and accordingly the shipping profile is configured for storage and indexing within the database based entirely on the information/data stored in the indexable information/data fields of the management computing entity 100.

In certain embodiments, the translation module may be configured to fully translate information from a first language (e.g., in a first language encoding) into the standardized language (e.g., in the standardized language encoding). For example, the translation module may be configured to identify both the standardized language characters utilized to represent information presented in the first language, and the standardized language words (e.g., strings of characters) representing information presented in the first language. Thus, the translated information may be presented entirely in the standardized language such that the information is readable in the standardized language. In other embodiments, the translation module may be configured to transliterate the information from the first language (e.g., in a first language encoding) into a first language equivalent utilizing standardized language character encodings to represent the information provided in the first language. For example, the transliterated information may be presented using standardized language encoding to present words and/or phrases using the first language. As a specific example, the transliterated information/data may be presented using the standardized language character encodings to present a string of characters representing the manner in which a particular word or phrase would be pronounced in the first language, using the standardized language encoding.

4. Utilizing Information/Data Stored in the Shipping Profile

As noted herein, the shipping profile may be configured for storing and indexing the shipping information/data based on translated shipping information/data stored in a standardized language encoding and stored in the indexable information/data fields of the shipping profile. Moreover, the information/data stored in the indexable information/data fields may be utilized by one or more computing entities (e.g., management computing entity 100 and/or user computing entity 110) for tracking the location and/or status of the corresponding shipment (e.g., via one or more executable programs operable to utilize information/data encoded in the standardized language) and/or the like. However, in certain embodiments, the shipping information/data input (and/or shipping information/data provided in a second language) may be utilized by one or more carrier employees and/or other individuals associated in delivering the shipment/item to the intended destination. For example, package handlers proximate the destination location (e.g., package handlers delivering the shipment/item to the final destination location) may prefer to utilize shipping information/data in the local language, which may be the language of the originally received shipping information/data input (e.g., in embodiments in which the shipping information/data input is provided by an intended recipient of the shipment/item). Accordingly, the shipping information/data stored in the one or more non-indexable information/data fields may be retrieved and/or utilized by one or more computing entities while the shipment/item is being transported between the shipment's origin location and destination location. For example, one or more user computing entities 110 may be configured to retrieve the shipping information/data and to print a shipping label comprising shipping information/data in the first language (or a second language different from the first language and the standardized language); one or more user computing entities 110 may be configured to retrieve the shipping information/data and generate a graphical display for a user of the shipping information/data stored in the non-indexable information/data fields, and/or the like.

As discussed herein, the information/data profiles are configured to provide the shipping information/data in the first language (e.g., from the non-indexable information/data fields) to one or more user computing entities 110 to generate output in the first language. For example, a user computing entity 110 located at a particular carrier location proximate a destination location for a shipment may be configure to retrieve the shipping profile for the shipment when the shipment is ready for delivery to a final destination location. The user computing entity 110 may then generate a shipping label to be adhered to the shipment to facilitate final delivery by carrier employees near the destination location (e.g., within a destination country), and the shipping label may be presented in the first language, which may be a local language for the destination country. As yet another example, a carrier employee may utilize a handheld user computing entity 110 to scan a package indicia located on the package during a package sort process, and the handheld user computing entity 110 may be configured to retrieve information/data stored in the shipment profile and to display a portion of the stored shipping information/data in the first language via a display component of the handheld user computing entity 110.

Specifically, a user computing entity 110 may be configured to retrieve shipping information/data from the database at least in part by transmitting an information/data request to the database. The user computing entities 110 may be configured to generate such requests for information/data in response to one or more trigger events, such as the scanning of an indicia on a shipment, receipt of user input requesting shipping information/data regarding a particular shipment, and/or the like. Accordingly, upon the occurrence of a trigger event detected by a user computing entity 110, the user computing entity 110 is configured to generate a request for shipping information regarding a particular shipment. The request may be an electronic information/data file comprising information/data indicative of a shipment for which information/data is requested (e.g., identified based at least in part on a shipment identifier, a portion of shipping information/data stored in the standardized language, a portion of shipping information/data stored in one or more non-indexable information/data fields, and/or the like. The user computing entity 110 may then transmit the request (e.g., via one or more network connections) to the database.

As indicated at Block 408, the database (e.g., one or more management computing entity 100 managing the database) receives the request for shipping information for one or more shipments. The database then interprets the request for shipping information, and retrieves the applicable shipping profile identified by the request. The database then determines a requested language for the shipping information, and determines whether the shipping information is stored in the requested language, as indicated at Blocks 409-410.

Upon determining that the request is for the shipping information in the standardized language (as indicated at Block 409), the database transmits the shipping information in the standardized language to the requesting user computing entity 110. For example, the database retrieves at least a portion of the shipping information/data stored in one or more of the indexable information/data fields, and transmits the information/data to the requesting user computing entity 110.

Similarly, upon determining that the request is for shipping information in the first language, the database transmits the shipping information in the first language to the requesting user computing entity 110. For example, the database retrieves at least a portion of the shipping information/data stored in one or more of the non-indexable information/data fields, and transmits the information/data to the requesting user computing entity 110. As discussed above, the database may additionally transmit an executable program with the non-indexable information/data to facilitate conversion to encoded text at the receiving user computing entity 110. For example, in embodiments in which the non-indexable information/data is stored as hexadecimal equivalents in the database, the database may transmit an executable program with the non-indexable information/data to facilitate conversion of the hexadecimal information/data to corresponding language characters in the first language once the information/data is received at the user computing entity 110.

The user computing entity 110 may then generate an output via one or more output mechanisms. For example, as indicated previously, the user computing entity 110 may print a shipping label to be adhered to the package, the user computing entity 110 may print an invoice, a packing list, a waybill, and/or the like comprising information/data regarding the shipment/item. The user computing entity 110 may also generate a display, for example, via an included display component of the user computing entity 110, comprising at least a portion of the shipping information/data.

In various embodiments, the user computing entity 110 may request, receive, and display shipping information/data regarding a particular shipment in both the standardized language and the first language. In such embodiments, the user computing entity 110 may be configured to generate a composite output (e.g., a label, a display, and/or the like) in which at least a portion of the displayed information/data is in the standardized language and at least a portion of the displayed information/data is in the first language. For example, the generated display may comprise a shipping label in which a portion of the included information/data is in the standardized language (e.g., the zip/postal code and the country), and other portions of the displayed information/data is in the first language (e.g., the recipient name, the street address, the city name, and/or the like). In various embodiments, the generated output may comprise multiple shipping labels, in which a first shipping label comprises the information/data in the standardized language, and the second shipping label comprises the information/data in the first language.

Moreover, in certain embodiments, a user computing entity 110 may be configured to request at least a portion of the stored shipping information/data in a second language not stored in the shipping profile. For example, the second language may be a local language where the user computing entity 110 is located, a preferred language of a user of the user computing entity 110, and/or the like. Accordingly, the request for the shipping information/data may additionally comprise an indication of a second language for which the shipping information/data is requested, in addition to the indication of a shipment for which information/data is requested.

In certain embodiments, a user computing entity 110 may be configured to self-determine its location (e.g., via one or more onboard location determining devices, such as a GPS component), and to utilize the determine location of the third party computing entity to determine an appropriate language in which the shipping information/data is requested. For example, upon determining a location of the user computing entity 110, the user computing entity 110 may be configured to compare the determined location against an index of languages typically spoken at the determined location, and to update the request for shipping/information to indicate that the shipping information/data is requested in a determined preferred language for the current location of the user computing entity 110. The user computing entity 110 may be configured to self-determine the preferred language based on locally stored information/data indicative of various preferred languages spoken in various preferred locations, and/or the user computing entity 110 may be configured to request an indication of a preferred language at a particular location from a separate computing entity, such as a language database comprising information/data indicative of a preferred language spoken in a plurality of locations.

As yet another example, the user computing entity 110 may have locally stored information/data indicative of a preferred language for a user of the user computing entity 110 (e.g., retrieved from user input provided by the user). In such embodiments, the user computing entity 110 may be configured to append an indication of the preferred language into a request for the shipping information/data to be provided to the database.

As indicated at Block 410, once the request is received at the database (e.g., by one or more management computing entity 100 managing the database), the database retrieves the corresponding shipping profile for the request, and extracts at least a portion of the stored information/data to fulfill the request. As indicated at Block 410, at least a portion of the information/data stored in the non-indexable information/data fields is extracted, and is provided to a translator module (as discussed herein) for translation to the second language indicated in the request. By utilizing the originally provided information/data in the first language, the translation process minimizes potential translation inaccuracies that may arise from providing a translation to the second language based on a prior translation to the standardized language. However, it should be understood that various embodiments may utilize at least a portion of the information/data stored in the standardized language for translation to the second language. For example, because the database may be incapable of processing the information/data provided in the first language (e.g., because the encoding methodologies utilized by the database may be incapable of deciphering characters in the first language), the database may be configured to provide the shipping information/data in the standardized language to the translation module.

Upon translation of the shipping information/data by the translation module, the database may be configured to provide the requested shipping information/data to the user computing entity 110 in the requested second language. As discussed above, the user computing entity 110 may then be configured to output the shipping information/data in the second language via one or more output mechanisms.

5. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-processing method for incorporating multiple language encodings into an indexed dataset processable by executable computing modules operable with a standardized language encoding, the method comprising:
   receiving an original input data encoded in a first language;
   generating a data profile having an associated data profile identifier, wherein the data profile comprises one or more indexable data fields and one or more non-indexable data fields;
   storing the original input data in the one or more non-indexable data fields, wherein the original input data in the one or more non-indexable data fields is retrievable;
   translating the original input data into translated input data encoded in the standardized language;
   storing the translated input data in the one or more indexable data fields of the data profile;
   providing the data profile comprising the original input data and the translated input data to a database storing a plurality of data profiles as an indexed dataset based at least in part on the translated input data encoded in the standardized language in each of the plurality of data profiles;
   receiving a first request for a first data output;
   identifying a preferred language for the first data output, wherein the first data output comprises the original input data stored in the one or more non-indexable data fields, wherein the first request for the first data output identifies requested data based at least in part on at least one of: the associated data profile identifier or a portion of the translated input data stored in the one or more indexable data fields;
   retrieving a first data profile associated with the first request for the first data output;
   translating the first data output stored in the one or more indexable data fields to the preferred language; and
   generating the first data output comprising at least the portion of the translated input data stored in the one or more indexable data fields translated to the preferred language and at least a portion of the original input data retrieved from one or more of the one or more non-indexable data fields of the first data profile.

2. The computer-processing method of claim 1, further comprising:
   generating an image data comprising one or more images of the original input data encoded in the first language;
   storing the image data in the data profile in at least one of the one or more non-indexable data fields.

3. The computer-processing method of claim 2, further comprising:
   receiving a second request for a second data output and interpreting the second request, the second request comprising the original input data, wherein the second request for the second data output identifies the requested data based at least in part on at least one of: the associated data profile identifier or a portion of the translated input data;
   retrieving a second data profile associated with the second request for the second data output; and
   generating the second data output by presenting the image data retrieved from the second data profile.

4. The computer-processing method of claim 1, wherein the standardized language encoding is a single-byte language encoding.

5. The computer-processing method of claim 4, wherein the first language encoding is a multi-byte language encoding.

6. The computer-processing method of claim 1, wherein the standardized language and the first language are encoded using a hexadecimal encoding.

7. The computer-processing method of claim 6, wherein the standardized language and the first language are encoded using a Unicode encoding.

8. The computer-processing method of claim 7, wherein the standardized language encoding comprises a first plurality of characters encoded via a first subset of code points and the first language encoding comprises a second plurality of characters encoded via a second subset of code points.

9. The computer-processing method of claim 1, further comprising: receiving a second request for a second data output, wherein the second request identifies a second data profile and a second language;
   retrieving the second data profile;
   translating the original input data from the one or more non-indexable data fields into a second translated input data corresponding to the second language; and
   generating the second data output by presenting at least a portion of the second translated input data.

10. The computer-processing method of claim 1, further comprising:
    receiving a second request for a second data output, wherein the second request identifies a second data profile and a request location;
    identifying a second language for the second request based at least in part on the request location;
    retrieving the second data profile;
    translating the original input data from the one or more non-indexable data fields into a second translated input data corresponding to the second language; and
    generating the second data output by presenting at least a portion of the second translated input data.

11. The computer-processing method of claim 1, further comprising:
    receiving a second request for a composite data output comprising at least the portion of the original input data and at least the portion of the translated input data, wherein the second request for the composite data output identifies the requested data based at least in part on at least one of: the associated data profile identifier or the portion of the translated input data;
    retrieving a second data profile associated with the second request for the composite data output; and
    generating the composite data output by presenting at least the portion of the original input data retrieved from one or more of the one or more non-indexable data fields of the second data profile and by presenting at least the portion of the translated input data retrieved from the one or more of the indexable data fields.

12. A computing system for incorporating multiple language encodings into an indexable dataset processable by executable computing modules operable with a standardized language encoding, the computing system comprising:
    at least one nontransitory computer readable storage medium;

one or more computer processors collectively configured to:
receive original input data encoded in a first language;
generate a data profile having an associated data profile identifier, wherein the data profile comprises one or more indexable data fields and one or more non-indexable data fields;
store the original input data in the one or more non-indexable data fields, wherein the original input data in the one or more non-indexable data fields is retrievable;
translate the original input data into translated input data encoded in the standardized language;
store the translated input data in the one or more indexable data fields of the data profile;
provide the data profile comprising the original input data and the translated input data to a database storing a plurality of data profiles as an indexed dataset based at least in part on the translated input data encoded in the standardized language in each of the plurality of data profiles;
receive a first request for a first data output;
identify a preferred language for the first data output, wherein the first data output comprises the original input data stored in the one or more non-indexable data fields, wherein the first request for the first data output identifies requested data based at least in part on at least one of: the associated data profile identifier or a portion of the translated input data stored in the one or more indexable data fields;
retrieve a first data profile associated with the first request for the first data output;
translate the first data output stored in the one or more indexable data fields to the preferred language; and
generate the first data output comprising at least the portion of the translated input data stored in the one or more indexable data fields translated to the preferred language and at least a portion of the original input data retrieved from one or more of the one or more non-indexable data fields of the first data profile.

13. The computing system of claim 12, wherein the one or more processors are additionally configured to:
receive a second request for a second data output comprising the original input data, wherein the second request for the second data output identifies the requested data based at least in part on at least one of: the associated data profile identifier or the portion of the translated input data;
retrieve a second data profile associated with the second request for the second data output; and
generate the second data output by presenting at least the portion of the original input data retrieved from the one or more non-indexable data fields of the second data profile.

14. The computing system of claim 12, wherein the one or more processors are additionally configured to:
receive a second request for a second data output, wherein the second request identifies a second data profile and a second language;
retrieve the second data profile;
translate the original input data from the one or more non-indexable data fields into a second translated input data corresponding to the second language; and
generate the second data output by presenting at least a portion of the second translated input data.

15. The computing system of claim 12, wherein the one or more processors are additionally configured to:
receive a second request for a composite data output comprising at least the portion of the original input data and at least the portion of the translated input data, wherein the second request for the composite data output identifies the requested data based at least in part on at least one of: the associated data profile identifier or the portion of the translated input data;
retrieve a second data profile associated with the second request for the composite data output; and
generate the composite data output by presenting at least the portion of the original input data retrieved from one or more of the one or more non-indexable data fields of the second data profile and by presenting at least the portion of the translated input data retrieved from the one or more indexable data fields.

16. A computer program product comprising at least one non-transitory computer-readable storage medium having computer-readable program code portions stored therein, the computer-readable program code portions comprising:
an executable portion configured to receive original input data encoded in a first language;
an executable portion configured to generate a data profile having an associated data profile identifier, wherein the data profile comprises one or more indexable data fields and one or more non-indexable data fields;
an executable portion configured to store the original input data in the one or more non-indexable data fields, wherein the original input data in the one or more non-indexable data fields is retrievable;
an executable portion configured to translate the original input data into translated input data encoded in a standardized language;
an executable portion configured to store the translated input data in the one or more indexable data fields of the data profile;
an executable portion configured to provide the data profile comprising the original input data and the translated input data to a database storing a plurality of data profiles as an indexed dataset based at least in part on the translated input data encoded in the standardized language in each of the plurality of data profiles;
an executable portion configured to receive a first request for a first data output;
an executable portion configured to identify a preferred language for the first data output, wherein the first data output comprises the original input data stored in the one or more non-indexable data fields, wherein the first request for the first data output identifies requested data based at least in part on at least one of: the associated data profile identifier or a portion of the translated input data stored in the one or more indexable data fields;
an executable portion configured to retrieve a first data profile associated with the first request for the first data output;
an executable portion configured to translate the first data output stored in the one or more indexable data fields to the preferred language; and
an executable portion configured to generate the first data output comprising at least the portion of the translated input data stored in the one or more indexable data fields translated to the preferred language and at least a portion of the original input data retrieved from one or more of the one or more non-indexable data fields of the first data profile.

17. The computer program product of claim 16, further comprising:
- an executable portion configured to receive a second request for a second data output comprising the original input data, wherein the second request for the second data output identifies the requested data based at least in part on at least one of: the associated data profile identifier or the portion of the translated input data;
- an executable portion configured to retrieve a second data profile associated with the second request for the second data output; and
- an executable portion configured to generate the second data output by presenting at least a portion of the original input data retrieved from the one or more non-indexable data fields of the second data profile.

18. The computer program product of claim 16, further comprising:
- an executable portion configured to receive a second request for a second data output, wherein the second request identifies a second data profile and a second language;
- an executable portion configured to retrieve the second data profile;
- an executable portion configured to translate the original input data from the one or more non-indexable data fields into a second translated input data corresponding to the second language; and
- an executable portion configured to generate the second data output by presenting at least a portion of the second translated input data.

19. The computer program product of claim 16, further comprising:
- an executable portion configured to receive a second request for a composite data output comprising at least the portion of the original input data and at least the portion of the translated input data, wherein the second request for the composite data output identifies the requested data based at least in part on at least one of: the associated data profile identifier or the portion of the translated input data;
- an executable portion configured to retrieve a second data profile associated with the second request for the composite data output; and
- an executable portion configured to generate the composite data output by presenting at least the portion of the original input data retrieved from the one or more non-indexable data fields of the second data profile and by presenting at least the portion of the translated input data retrieved from the one or more indexable data fields.

\* \* \* \* \*

UNITED STATES PATENT AND TRADEMARK OFFICE
CERTIFICATE OF CORRECTION

| | |
|---|---|
| PATENT NO. | : 11,449,495 B2 |
| APPLICATION NO. | : 15/664882 |
| DATED | : September 20, 2022 |
| INVENTOR(S) | : Murali Krishna Utla et al. |

It is certified that error appears in the above-identified patent and that said Letters Patent is hereby corrected as shown below:

In the Specification
Column 3, Line 30: delete "embodiments; and" and insert -- embodiments; --
Column 3, Line 32: delete "embodiments." and insert -- embodiments; and --
Column 22, Line 49: after "requested" delete "("

In the Claims
Column 26, Line 61, in Claim 11: after "the one or more" delete "of the"
Column 26, Line 66, in Claim 12: delete "nontransitory computer readable" and insert
-- non-transitory computer-readable --

Signed and Sealed this
Thirteenth Day of December, 2022

Katherine Kelly Vidal
*Director of the United States Patent and Trademark Office*